(12) United States Patent
Tsuda et al.

(10) Patent No.: US 10,281,777 B2
(45) Date of Patent: May 7, 2019

(54) PIXEL CONFIGURATION FOR A CURVED DUAL-PANEL ELECTRONIC DISPLAY DEVICE

(71) Applicant: Panasonic Liquid Crystal Display Co., Ltd., Himeji-shi, Hyogo (JP)

(72) Inventors: Kazuhiko Tsuda, Hyogo (JP); Katsuji Tanaka, Hyogo (JP)

(73) Assignee: Panasonic Liquid Crystal Display Co., Ltd., Hyogo (JP)

(*) Notice: Subject to any disclaimer, the term of this patent is extended or adjusted under 35 U.S.C. 154(b) by 56 days.

(21) Appl. No.: 15/476,204

(22) Filed: Mar. 31, 2017

(65) Prior Publication Data
US 2018/0284546 A1 Oct. 4, 2018

(51) Int. Cl.
*G02F 1/1343* (2006.01)
*G02F 1/1347* (2006.01)

(52) U.S. Cl.
CPC ...... *G02F 1/134309* (2013.01); *G02F 1/1347* (2013.01)

(58) Field of Classification Search
CPC ............ G02F 1/134309; G02F 1/1347; G02F 1/13336; G02F 1/1333; G02F 1/133305; G02F 1/136277; G02F 2001/133302; G02F 2001/133368; G02F 2001/133354; G02F 2201/56; G02F 1/116; G02F 1/133509; G02F 1/216; G02F 2001/133521; G02F 1/133514; G02F 1/133512; G02F 1/136209; G02F 1/13473; G02F 1/133371; G02F 2001/136222; G02F 2001/136218; H01L 27/12; H01L 27/1203; H01L 27/1218; H01L 21/02367; G02B 5/0294; G02B 6/3532; G03G 15/0435; H01J 9/205; H01J 11/44; H01J 2211/444; H01J 2329/323; H01J 29/327
USPC ................................... 349/74, 158, 104–111
See application file for complete search history.

(56) References Cited

U.S. PATENT DOCUMENTS

| | | | |
|---|---|---|---|
| 8,451,201 B2 | 5/2013 | Hirata et al. | |
| 8,982,545 B2 | 3/2015 | Kim et al. | |
| 2007/0046777 A1* | 3/2007 | Song | H04N 13/324 348/56 |
| 2009/0051707 A1 | 2/2009 | Hirata et al. | |
| 2009/0147186 A1* | 6/2009 | Nakai | G02F 1/13471 349/74 |
| 2009/0161048 A1* | 6/2009 | Satake | G02F 1/133305 349/110 |
| 2011/0228190 A1* | 9/2011 | Yang | G02F 1/13394 349/56 |
| 2012/0320509 A1 | 12/2012 | Kim et al. | |

(Continued)

*Primary Examiner* — Shan Liu
(74) *Attorney, Agent, or Firm* — Hamre, Schumann, Mueller & Larson, P. C.

(57) ABSTRACT

A curved dual-panel electronic display device including a back display panel having a curved shape and a plurality of pixels and a front display panel having a curved shape and a plurality of pixels. The front display panel back display panel being stacked and curved such that the outer surface of the front display has convex shape. A first pixel from the front display panel overlaps with a second pixel from a second display panel in a normal view, and a length of the first pixel in a direction of the curve of the front display panel is larger than the length of the second pixel in a length direction of the curve of the back display panel.

2 Claims, 5 Drawing Sheets

(56) References Cited

U.S. PATENT DOCUMENTS

| | | | | |
|---|---|---|---|---|
| 2014/0211112 A1* | 7/2014 | Yang | ............... | G02B 27/2214 |
| | | | | 349/15 |
| 2015/0092362 A1* | 4/2015 | Ahn | ............... | H05K 1/189 |
| | | | | 361/749 |
| 2016/0295715 A1* | 10/2016 | Cho | ............... | B32B 7/12 |
| 2017/0047351 A1* | 2/2017 | Kwon | ............... | G06F 1/1601 |

* cited by examiner

PIXEL CONFIGURATION FOR A CURVED DUAL-PANEL ELECTRONIC DISPLAY DEVICE

FIELD

This disclosure relates to the configuration of the pixels in a curved electronic display device having at least two display panels.

BACKGROUND

An electronic display device displays an image by providing a plurality of tiny individual pixels that form the displayed image. The pixels for the displayed image are formed by filtering light through a series of corresponding pixels formed in the display panels of the electronic display device. Previously, electronic display devices were formed as flat devices. However, newer curved electronic display devices have been designed that provide a curved display surface.

BRIEF SUMMARY

A curved dual-panel electronic display device can include a front display panel having pixels that are longer in a curved direction in a curved portion than the pixels in the back display panel. The pixels in the front panel may have a length that increases based upon the curvature of the display panels. The longer pixels in the front display panel may ensure that the corresponding pixels in the front display panel and the back display panel are better aligned in a direction that is normal to the outer surface of the front display panel.

In an embodiment, a curved dual-panel electronic display device includes a back display panel and a front display panel that are stacked to each other and are curved in the same manner such that an outer surface of the front display panel forms a convex shape. The back display panel has a curved shape in a length direction and includes a plurality of pixels arranged in rows along the length direction of the back display panel. The front display panel has a curved shape in a length direction and includes a plurality of pixels arranged in rows along the length direction of the front display panel. A first pixel of the plurality of pixels in the front display device at least partially overlaps with a second pixel of the plurality of pixels in the back display panel in a normal view with respective to the outer surface of the front panel. The first pixel has a length that is larger than a length of the second pixel.

In another embodiment, a curved dual-panel electronic display device includes a front display panel having a front display area defined by its plurality of pixels and a back display panel having a back display area defined by its plurality of pixels. The front and back display panel are stacked and curved such that outer surface of the front display panel forms a convex shape. The area of the front display area is larger than the area of the back display area.

In another embodiment, a curved dual-panel electronic display device includes a front display panel having a front display area defined by its plurality of pixels and a back display panel having a back display area defined by its plurality of pixels. The front and back display panel are stacked and curved such that outer surface of the front display panel forms a convex shape. The back display area includes a main display area and marginal areas and the main display area has the same number of pixels as the front display area. The length of the rows of pixels in the front display area is longer than the length of the rows of pixels of the main display area.

BRIEF DESCRIPTION OF THE DRAWINGS

Both described and other features, aspects, and advantages of a curved dual-panel electronic display device will be better understood with reference to the following drawings.

Like reference numbers represent like parts throughout.

DETAILED DESCRIPTION

The electronic display device may be in the form of a liquid crystal electronic display ("LCD") device, and the principles explained herein can be applied to other types of display devices. For example, such display devices can be used as light emitting diode ("LED") or organic light emitting diode ("OLED") display devices. The electronic display device can be constructed of two display panels. A front electronic display panel, which is the display panel that is closest to the viewer, may have pixels that filter color for the pixels in the displayed image. A back display panel may be provided to control the contrast of the pixels of the displayed image by having pixels that filter the amount of light provided to the front display panel. A light source may provide light that travels though the pixels of the back display panel and the front display panel, in that order, to produce the pixels in the displayed image.

A controller in the electronic display device controls each set of overlapping pixels in the display panels to produce the displayed image. In flat display panels, the pixels in the front display panel and the pixels in the back display panel have the same dimensions (length and width). Newer electronic display devices may be designed to provide a curved display surface. In such curved electronic display devices, the front display panel and back display panel have different lengths, as the front display panel has a shape that curves around the back display panel. This difference in lengths can be even greater when there is a gap between the front and back display panels. The difference in display panel lengths can cause the quality of the displayed image to deteriorate due to the misalignment of the corresponding pixels in the front and back display panels.

Embodiments provided in this specification may describe a curved dual-panel electronic display device including a front display panel having a plurality of pixels and a back display panel having a plurality of pixels. In an embodiment, one pixel of the plurality of pixels of the front display panel overlaps with one pixel of the plurality of pixels in the back display device and the one pixel of the front display panel may have a length that is larger than the one pixel of the back display panel. In an embodiment, the plurality of pixels in a front display panel may define a front display area and the plurality of pixels in a back display panel may define a back display area. The front display area may be larger than the back display area in such an embodiment.

Figure 1:
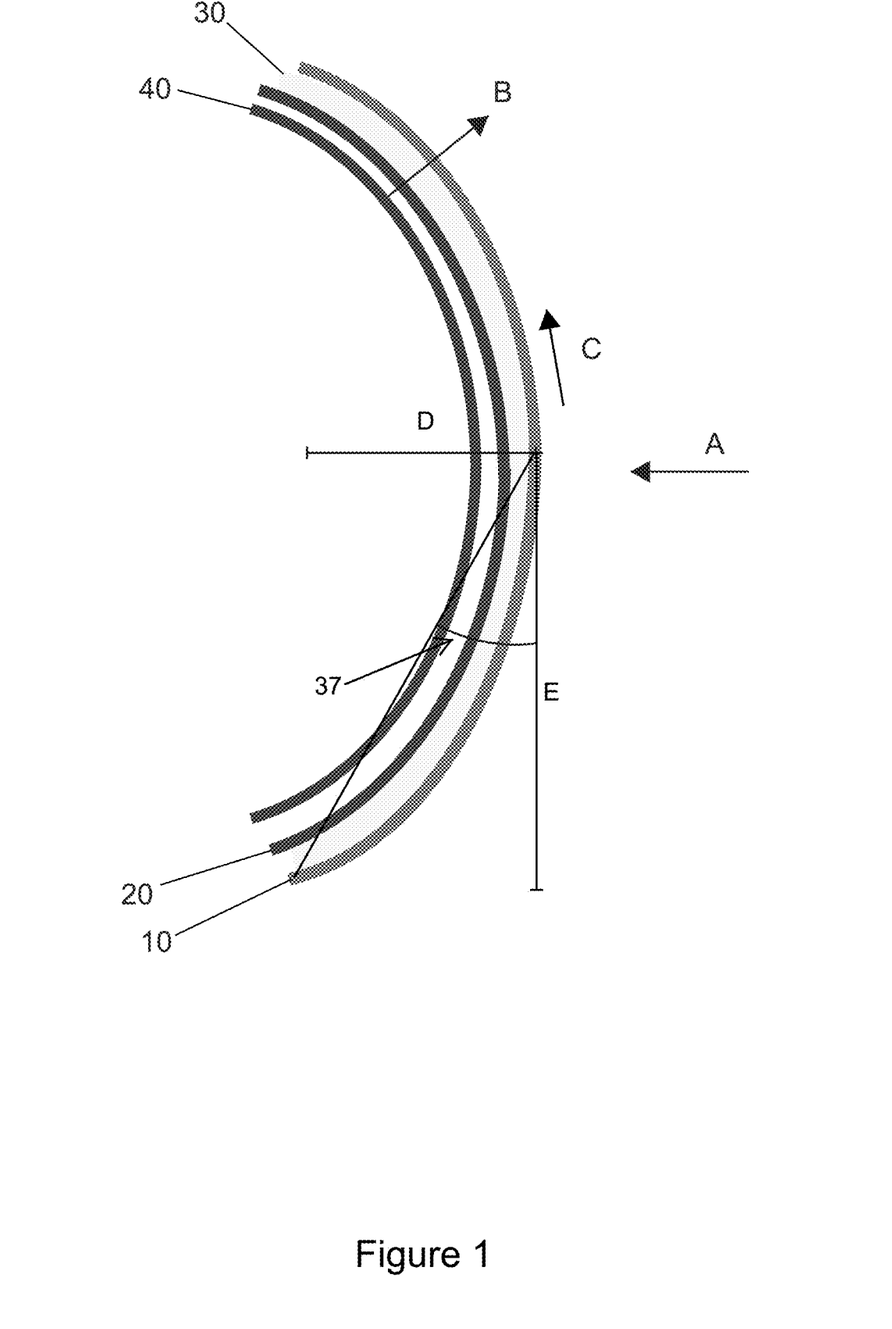
FIG. 1 shows a schematic diagram of the arrangement of the curved panels in an embodiment of a curved dual-panel electronic display device.

FIG. 1 shows a schematic diagram of the display panels in an embodiment of a curved dual-panel electronic display device. The view shown in FIG. 1 is perpendicular to the viewing surface of the curved dual-panel electronic display device. The curved dual-panel electronic display device in this embodiment is a LCD device. The LCD curved dual-panel electronic display device includes a front display panel 10 and a back display panel 20. The front display panel 10 is the display panel that is closest to the viewer. Accordingly, the viewer would view the LCD curved dual-panel electronic display device in the direction A. The front display panel 10 and the back display panel 20 are separated by a gap 30. The gap 30 may be caused by the materials of the panels themselves (e.g., a polarizer, a substrate, a diffuser, etc.). As discussed above, the curvature of the display panels 10, 20 and the gap 30 causes a front display panel 10 to have a larger length then the back display panel 20. Pixels are formed in each of the display panels 10, 20 shown in FIG. 1 and would face the viewer (i.e. the opposite direction of arrow A). The LCD curved dual-panel electronic display device includes a light source, such as the backlight 40 shown in FIG. 1. The light provided by a backlight 40 travels in the direction B and is filtered by corresponding sets of pixels in the back display panel 20 and the front display panel 10 to form the displayed image.

Each display panel may have a display area. The display area is the area of the outer surface of the display panel that includes all the pixels required for forming a display image. Accordingly, a front display panel 10 would have front display area and the back display panel 20 would have a back display area. The display areas are described in more detail below.

Each display panel may have a length in the same direction as its curvature as shown by the direction C in FIG. 1. Each display panel would then have a width in a direction perpendicular to both directions C and A (described in more detail below). The "length" will typically be a horizontal direction in the visual viewing state, and the "width" will typically be a vertical direction in the visual viewing state.

The curved display panels 10, 20 may be curved so that they form a convex shape as shown in FIG. 1. The convex shape may be oriented in the general direction of the viewer, which would be the opposite direction of the direction A. The curvature of each panel 10, 20 may be described as ratio of a displacement length and the length curved. The displacement length and curved length may be measured from the point where the curvature begins. For example, the curvature of both display panels 10, 20 in the embodiment in FIG. 1 would begin at the apex of the convex shape. The displacement length D would be distance measured in the viewing direction A from the start of the curvature to its end, which would be the end of the display panel in the embodiment shown in FIG. 1. The curved distance E would be the distance from the start of the curvature to the end of the curvature as in a direction perpendicular to the viewing direction; the curved distance may also be described as the length of the display panel if the display panel had no curvature.

Additionally or alternatively, the curvature of the display panel may be expressed as a degree of curvature. For example in the embodiment shown in FIG. 1, a front display panel 10 may have a degree of curvature 37 as shown. While the curvature as explained above is shown for the entire curved portion, it should be understood that curvature can also be measured along smaller portions of the curved portion of display panels 10, 20. As such the curvature of the panel can be broken into small portions to determine if the amount or degree of curvature changes along the curved portion of the display panels 10, 20. In an embodiment, the display panels 10, 20 may have larger non-curved portions with smaller curved portions rather than being curved over a majority of their length as shown in the embodiment in FIG. 1.

Figure 2:
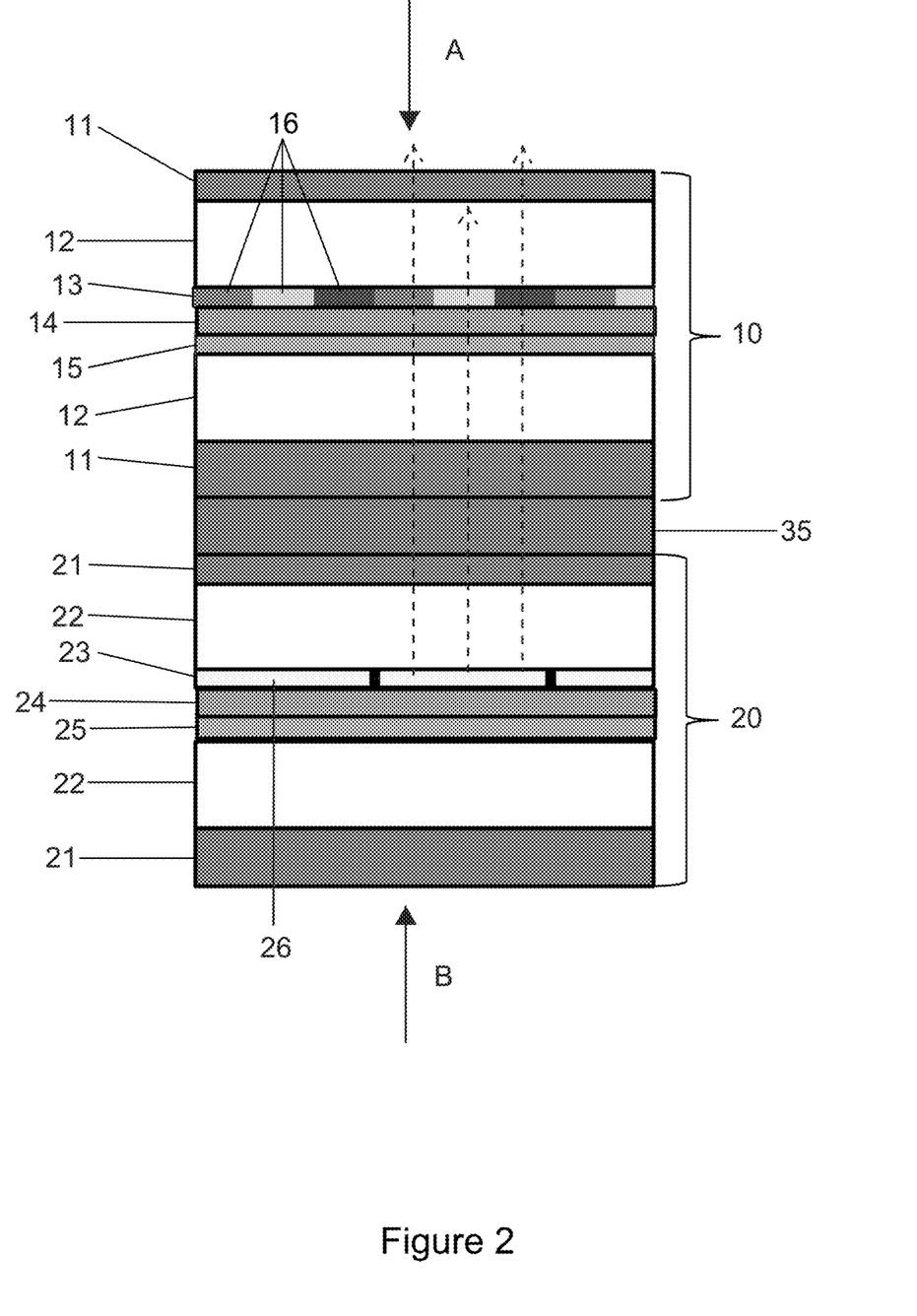
FIG. 2 shows the component layers of each of the curved LCD display panels in an embodiment of a curved dual-panel electronic display device.

FIG. 2 shows the layers of the display panels 10, 20 in an embodiment of a curved dual-panel electronic display device. The front display panel 10 and back display panel 20 may be affixed together in a viewing direction (as shown in FIG. 1). A diffusor 35 in the form of a layer or sheet may be provided between the display panels 10, 20. Each display panel is composed of series of layered components. A front display panel 10 in an embodiment may include a color filtering layer 13, a thin film transistor layer ("TFT") 15, and a liquid crystal layer 14 sandwiched between a pair of substrates 12 and a pair of 11 polarizers. The polarizers 11 polarize light in a single orientation. Following known principles of liquid crystal displays, the thin film transistor layer 15 may control whether the liquid crystal layer 14 changes the orientation of the light that passes through it. Accordingly, the liquid crystal layer 14 may be utilized so that light fails to pass through the outer polarizer 11. In such a manner the liquid crystal layer 14 may be manipulated so that only a specific amount of the light that passes through each of the sub-pixels 16, which may include none of the light, will pass through the outer polarizer 11. Each of the sub-pixels 16 may filter light to produce a specific color. For example, the sub-pixels 16 in the embodiment shown in FIG. 2 have a red, green, or blue filter. Each set of sub-pixels 16 combine together to form a pixel of the front display panel 10 that filters light to produce the required color for a pixel in the displayed image. The color filter layer 13 may also include a black matrix (not shown) between each of the sub-pixels 16 to prevent the mixing of the filtered light of the individual colors before it exits the individual sub-pixels 16. Each pixel in the front display panel 10 shown in FIG. 1 includes three sub-pixels 16. However, an embodiment may include four or more sub-pixels 16 and/or sub-pixels 16 having different colors than those described. A front display panel 10 in an embodiment may have a pixel with four sub-pixels 16 that are colored red, green, blue, and yellow. A front display panel 10 in an embodiment may have a pixel with four sub-pixels 16 that are colored red, green, blue, and white.

Referring to FIG. 2, a back display panel 20 in an embodiment may include a contrast filtering layer 23, a thin film transistor layer ("TFT") 25, and a liquid crystal layer 24 sandwiched between a pair of substrates 22 and a pair of 21 polarizers. The back display panel may operate in the same manner as described above for the front display panel 10, except for the characteristics of the contrast filtering layer 23. Instead of filtering light to produce a specific color as done by the pixels of the front display panel 10, the pixels of back display panel 20 filter the intensity of the light. Each pixel 26 in the back display panel controls the amount of light that is provided to each of pixel in the front display panel 10 as illustrated by the dashed arrows in FIG. 2. A pixel in a display panel that controls the amount of the light without modifying the light's color may also be described as a contrast pixel. In other embodiments, each pixel 26 in the back display panel 20 may include sub-pixels such that the back display panel 20 may provide individual subpixels to control the amount of light that is provided to each sub-pixel 16 in the front display panel 10. FIG. 2 shows the layers at or near the apex of the convex panels (as shown in FIG. 1). As such and for ease of understanding, the pixels of the front display panel 10 are shown having the same approximate length as pixels 26 of the back display panel 20. However, it should be understood that the lengths of each pixel in the color filter layer 13 as shown in FIG. 2 would be depend upon the curvature of front display panel 10 and the LCD curved dual-panel electronic display device as described herein. The gap 30 between the display panels 10, 20 shown in FIG. 1, may be formed due to the layers of the display panels 10, 20 (e.g. polarizers 11, 21, substrates 12, 22, liquid crystal layer 14, TFT layer 15, etc.) and the diffuser 35, separating the filtering layers 13, 23 of the display panels 10, 20.

Figure 3:
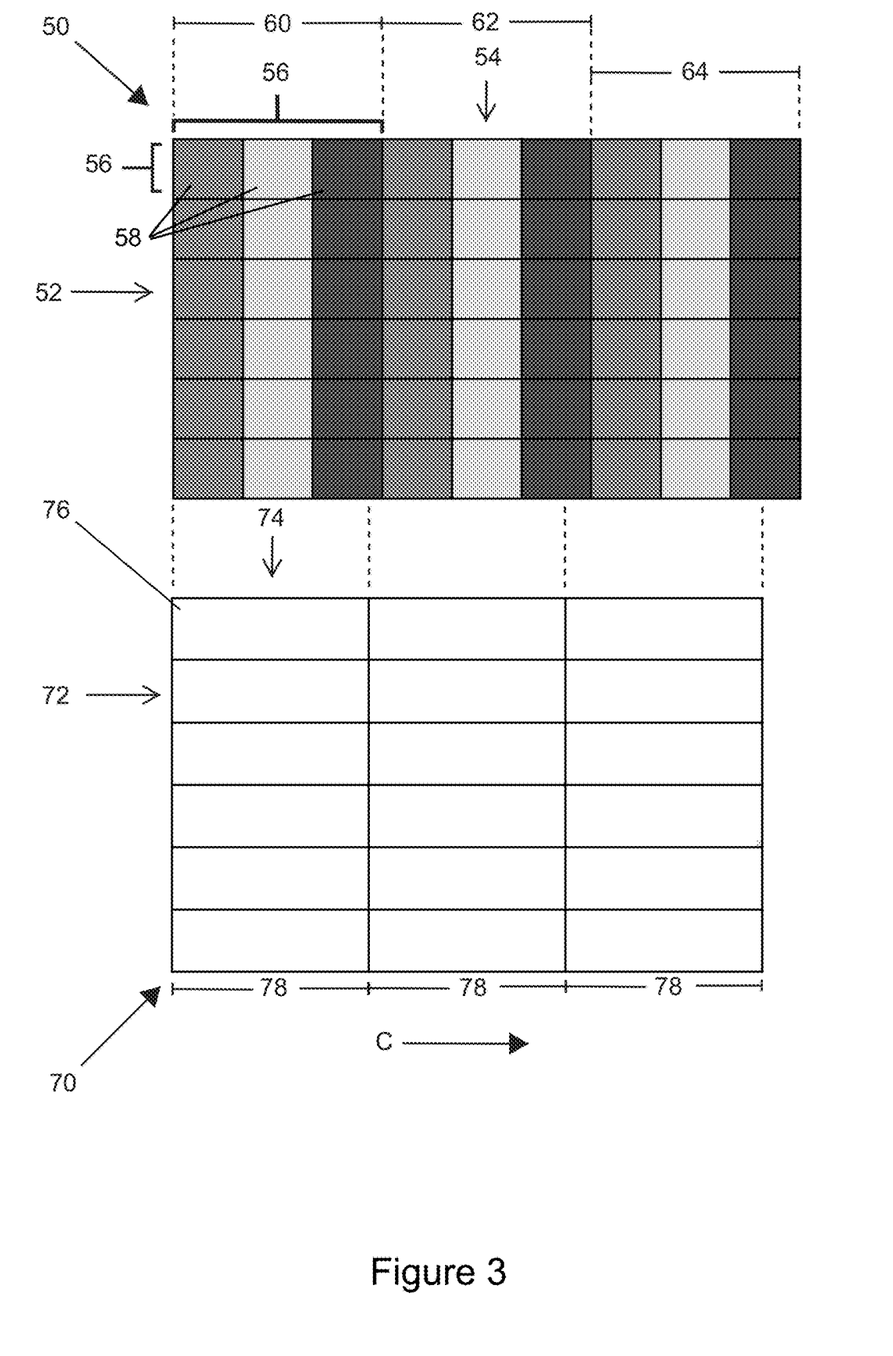
FIG. 3 shows a portion of a display area in a front display panel and a corresponding portion of a display area in a back display panel in an embodiment of a curved dual-panel electronic display device.

As described above, each display panel 10, 20 has a display area formed by its respective pixels. FIG. 3 shows a portion 50 of a display area in a front display panel 10 and a corresponding portion 70 of a display area in a back display panel 20 in an embodiment. FIG. 3 shows the portions of the display areas 50, 70 from an angle normal to the outer surface of the front display panel 10; the outer surface of the front display panel 10 would also be the display surface of the curved dual-panel electronic display device. It should be understood that FIG. 3 shows an exemplary portion 50, 70 of each display areas of their respective display panel 10, 20 and that each display area of each display panel 10, 20 would comprise a multitude of their respective display area portions 50, 70.

The display area portions 50, 70 are portions of each display area along the curved portion of the display panels 10, 20, respectively. As shown in FIG. 3, each display area portion 50, 70 includes eighteen pixels arranged in rows 52, 72 and columns 54, 74. As previously described, each pixel 56 in the front display panel 10 includes differently colored sub-pixels 58. The rows of pixels 52, 72 may be oriented along a length direction C of the front display panel 10 and back display panel 20, respectively. Accordingly, the rows of pixels 52, 72 in each display area may have a length. The lengths of the rows 52, 72 of each display panel 10, 20 may also define the length of each display area, respectively. Each display area would also have a width in the same direction as columns 56, 74 of the pixels of each display area, which would be perpendicular to the curved length of the display panels 10, 20 or the length of their respective display area. Some embodiments of a curved dual-panel electronic display device may have curved portions and non-curved portions. In such embodiments, the front display area in the curved portions of the font display panel 10 would have similar characteristics (e.g., an increased length 60, 62, 64, etc.) to the front display area portion 50 as described for FIG. 3. The portions of the front display area in the non-curved portions of the front display panel 10 in such embodiments would have pixels with lengths that are similar to the length 78 of the pixels in the back display area.

When the panels are affixed together, a pixel in the displayed image may be formed by the light that is filtered by a corresponding set of pixels in the front display area portion 50 and the back display area portion 70. For example, a pixel in the displayed image may be provided by light filtered by a pixel 56 in a front display area portion 50 and a pixel 76 in a back display area portion 70. To filter light as described, the pixels 56, 76 are arranged on a front display panel 10 and back display panel 20 such that they overlap in a direction that is normal to outer surface of the front display panel 10. As described above, the length of a front display panel 10 may be longer than the length of a back display panel 20. To account for the curvature of the display panels 10, 20, the pixels in the front display area portion 50 may have a length 60, 62, 64 that is longer than the length 78 of pixels of the back display area portion 70. As shown by the back display area portion 70, the pixels of the back display area may all have the same length 78. It should be understood that when comparing lengths of pixels, pixels having "similar" lengths include pixels having the same length or lengths that are within the manufacturing tolerances of each other, and that pixels with "different" lengths are pixels with differing lengths that are greater than just the manufacturing tolerances. The increased length of the pixels in the front display area allows the pixels of the display areas portions 50, 70 to have a better alignment in a direction normal to the outer surface of the front display panel 10. Each pixel in the displayed image when viewed in a normal direction is formed by light passing through a corresponding set of pixels in the front display area and the back display area. Accordingly, the back display area and the front display area would have the same number of pixels. As the back display area and front display area have the same number of pixels and the pixels in the front display area over the curved portions of the front display panel 10 have a longer length, the front display area would have a length that is longer than the back display area. The back display area and front display area would have a similar width as the front display panel 10 and back display panel 20 do not have a curvature in their width direction in the embodiment shown. The better alignment of the pixels in each display panel can ensure a higher quality image.

The increased length 60, 62, 64 of each pixel in the front display area portion 50 may be a function of the amount of curvature of a curved portion. As the curvature of a panel increases, the lengths of the pixels in the front display area portion 50 may be proportionally increased. In an embodiment of a curved dual-panel electronic display device that has a curved portion and a non-curved portion, the pixels in the front display area along the curved portion would have an increased length while the pixels in the front display area along a non-curved portion would have a length that is similar to the length 78 of the pixels in the back display area. The left sides of the display area portions 50, 70 in FIG. 3 are shown as aligned, but it should be understood that the display area portions 50, 70 are aligned as such to demonstrate the different lengths of the pixels and that the ends of the display portions 50, 70 may not be aligned as shown when the display panels 10, 20 are assembled.

Figure 4:
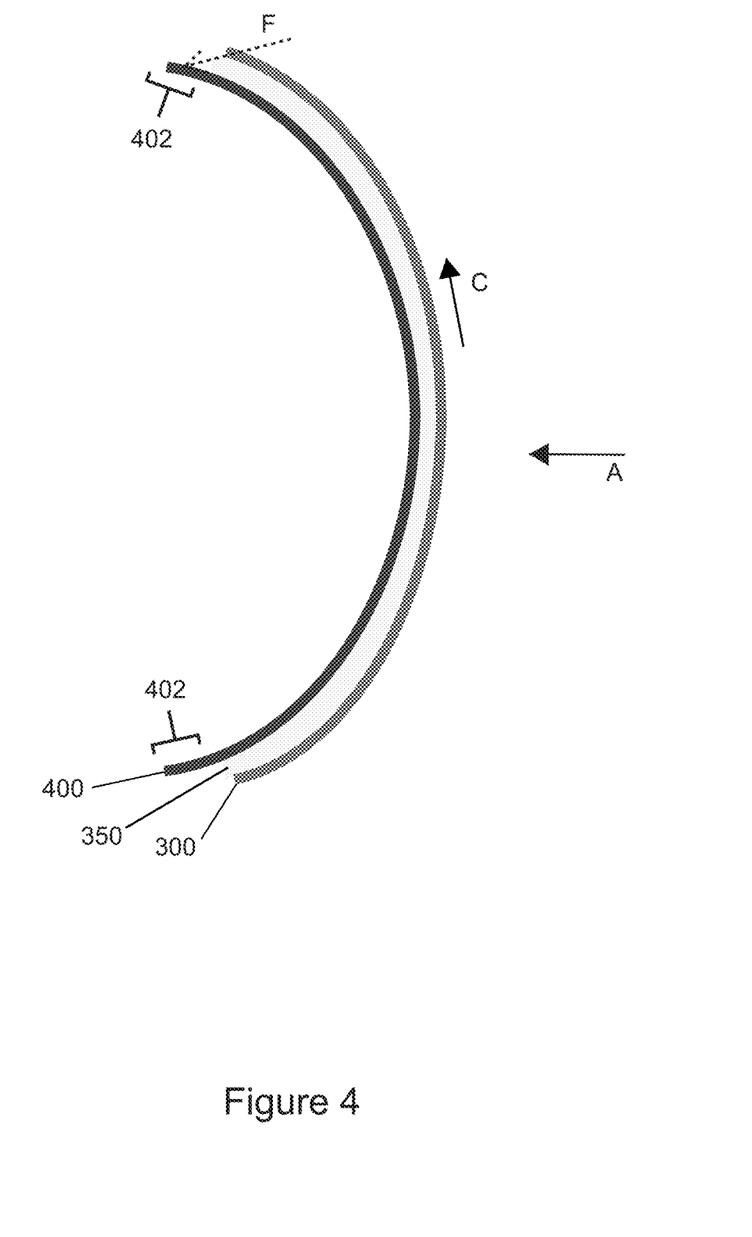
FIG. 4 shows a schematic diagram of the arrangement of the curved panels including a back display panel with a marginal display area in an embodiment of a curved dual-panel electronic display device.

FIG. 4 shows a schematic diagram of the arrangement of the curved display panels including a back display panel with a marginal display area in an embodiment of a curved dual-panel electronic display device. The display panels 300, 400 in the embodiment shown in FIG. 4 have a similar structure to the display panels 10, 20 shown in FIG. 1 including a gap 350 and a convex shape, except that the back display panel 400 includes marginal display areas 402. The marginal display areas 402 are located at the ends of the back display panel 400. Thusly, the back display area may have a main display area that is sandwiched by the marginal display areas 402. The main display area in an embodiment may be similar to the back display area described above regarding FIGS. 1-3. The marginal display areas 402 are provided for when the curved dual-panel electronic display device is viewed from an oblique angle as shown by the arrow F. The display panels 300, 400 shown in an embodiment may have a similar construction as described above for FIG. 2. The marginal pixels provide filtered light for the pixels at the end of each row 302 in the front display panel 300 when the curved dual-panel display device is viewed at an oblique angle. Accordingly, the marginal pixels do not provide any filtered light for the pixels in a displayed image when the curved dual-panel display device is viewed at an angle that is normal to the outer surface of the front display panel 300. In an embodiment, when the curved dual-panel display device is viewed at a normal angle, the pixels of the displayed image would be provided by light filtered by the pixels of the front display area and the corresponding pixels in the main display area.

Figure 5:
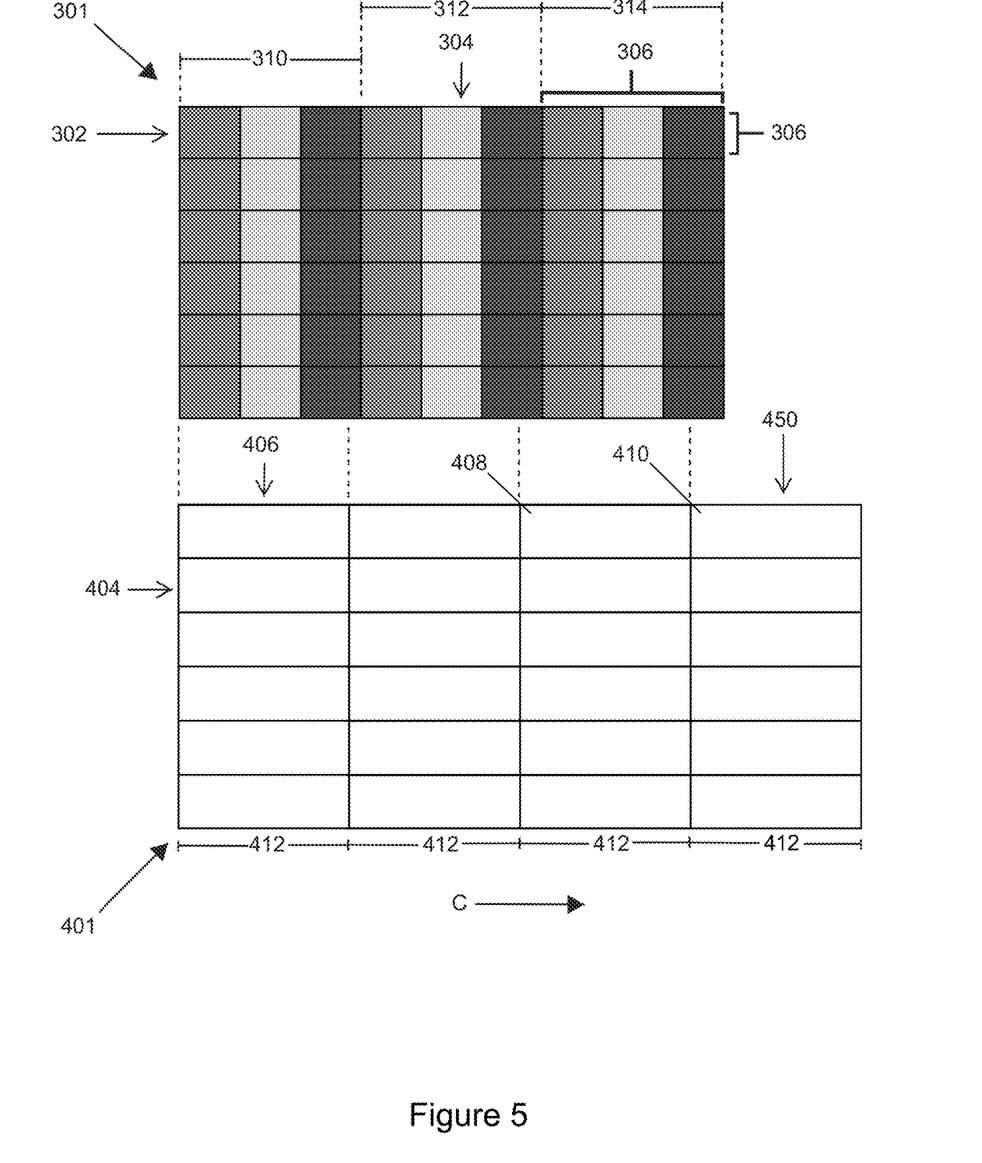
FIG. 5 shows a section of a display area in a front display panel and a corresponding section of a display area in a back display area including marginal pixels in an embodiment of a curved dual-panel electronic display device.

In an embodiment, each marginal display area 402 includes a column 450 of marginal pixels 410 as shown in FIG. 5. FIG. 5 shows a portion 301 of a display area in a front display panel 300 and a corresponding portion 401 of a display area in a back display panel 400 including marginal pixels in an embodiment of a curved dual-panel electronic display device. The display area portions 301, 401 shown in FIG. 5 are located at the curved end portions of each display panels 300, 400, respectively. Accordingly, a pixel 306 is the last pixel in its respective row of pixels 302 in the front panel display 300. Each marginal pixel is the last pixel in its respective row of pixels 404 in the back display panel 400. A pixel 306 in the front display area portion 301 is aligned with a pixel 408 in the back display area portion 401 in a direction normal to the outer surface of the front display panel 300 when the panels are assembled. This alignment allows light to travel through the overlapping pixels 306, 408 to display a pixel in the displayed image when viewed in the normal direction. The illustrated embodiment has a single column of marginal pixels 450, but other embodiments may include two or more columns of marginal pixels 450.

As described above, the marginal pixels are utilized when the curved dual-panel electronic display device is viewed at an oblique angle. When viewed at the oblique angle, a marginal pixel 410 provides filtered light for the pixel 306 at the end of the row of pixels 302 in the front display device 300. When the curved dual-panel electronic display device is viewed at an angle that is normal to its display surface, a pixel 408 in the back display area portion 401 may provide filtered light for the pixel 306 at the end of the row of pixels 302 in the front display panel 300. As such, the pixel 306 at the end of the row of pixels 302 in the front display device 300 may receive filtered light from either a marginal pixel 410 or a pixel 408 in a back display area portion 401. The other marginal pixels in the column of marginal pixels 450 would provide light for the other last pixels in their respective rows 302 in a similar manner to the marginal pixel 410 described above. The main display area in the back display panel 400 would not include the marginal pixels as the marginal pixels do not contribute to forming the pixels in a displayed image when the curved dual-panel electronic display device is viewed at an angle that is normal to the display surface of the curved dual-panel electronic display device.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. A curved dual-panel electronic display device comprising:
   a front display panel having a curved shape in a length direction and comprising a plurality of pixels arranged in rows along the length direction of the front display panel, the plurality of pixels of the front display panel defining a front display area having a length and a width; and
   a back display panel having a curved shape in a length direction and comprising a plurality of pixels arranged in rows along the length direction of the back display panel, the plurality of pixels of the back display panel forming a back display area comprising a length and a width, wherein
   the front display panel and the back display panel are stacked to each other and are curved in a same manner such that an outer surface of the front display panel is curved to form a convex shape,
   the back display area comprises a main display area and marginal display areas that sandwich the main display area, the main display area having the same number of pixels as the front display area such that each pixel in the main display area corresponds to one of the pixels in the plurality of pixels of the front display area,
   a length of the rows of pixels in the front display area is larger than a length of the rows of pixels in the main display area, and
   a number of pixels in the plurality of pixels of the back display panel is larger than a number of pixels in the plurality of pixels of the front display panel.

2. A curved dual-panel electronic display device comprising:
   a front display panel having a curved shape in a length direction and comprising a plurality of pixels arranged in rows along the length direction of the front display panel, the plurality of pixels of the front display panel defining a front display area having a length and a width; and
   a back display panel having a curved shape in a length direction and comprising a plurality of pixels arranged in rows along the length direction of the back display panel, the plurality of pixels of the back display panel forming a back display area comprising a length and a width, wherein
   the front display panel and the back display panel are stacked to each other and are curved in a same manner such that an outer surface of the front display panel is curved to form a convex shape,
   the back display area comprises a main display area and marginal display areas that sandwich the main display area, the main display area having the same number of pixels as the front display area such that each pixel in the main display area corresponds to one of the pixels in the plurality of pixels of the front display area,
   a length of the rows of pixels in the front display area is larger than a length of the rows of pixels in the main display area, and
   the length of the rows of pixels in the front display panel is shorter than a length of the rows of pixels in the back display area.

* * * * *